J. F. Pond

Wringer Roll.

No. 2,174. Reissued Feb. 13, 1866.

Witnesses:
Edm. F. Brown
J. R. Woodruff

Inventor:
Joseph F. Pond

N. PETERS, PHOTO-LITHOGRAPHER, WASHINGTON, D. C.

UNITED STATES PATENT OFFICE.

JOSEPH F. POND, OF CLEVELAND, OHIO.

ROLLERS FOR WRINGERS.

Specification forming part of Letters Patent No. 42,224, dated April 5, 1864; Reissue No. 2,174, dated February 13, 1866.

*To all whom it may concern:*

Be it known that I, JOSEPH F. POND, of Cleveland, in the county of Cuyahoga, in the State of Ohio, have invented certain new and useful Improvements in Elastic India-Rubber Rollers; and I hereby declare that the following is a description of the same, reference being had to the accompanying drawings, making a part of this specification, in which—

Figure 2:
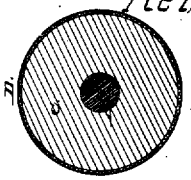
Figure 1:
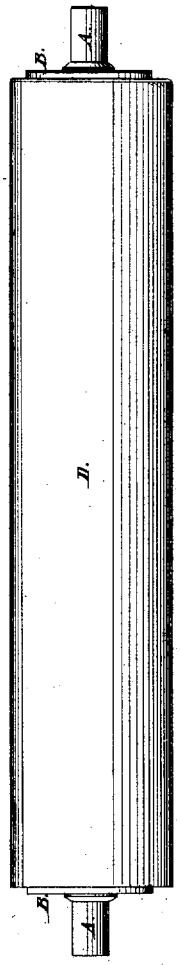
Figure 3:
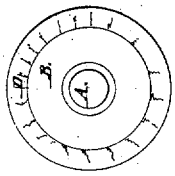

Figure 1 represents a longitudinal section of a roller covered with canvas. Fig. 2 shows an end view of the roller or cross-section of the elastic roller and cover. Fig. 3 is also an end view with the canvas cloth drawn over the rubber.

My invention consists in the application of canvas, cloth, or other similar material for the purpose of covering and protecting elastic india-rubber rollers, and to prevent the shaft from getting loose and turning in the roller.

To enable others skilled in the art to make and apply my invention, I will describe it more fully, referring to the drawings and to the letters marked thereon.

The india-rubber rollers which are ordinarily used for clothes-wringers, are a thick vulcanized india-rubber tube put onto an iron shaft, and kept from moving endwise by collars of metal secured to the shaft near the bearings.

When india-rubber rollers, constructed as above described, are used for wringing or pressing the water out of garments for wearing apparel, (many of which have metal and other hard material used for buttons, the tendency of which is to cut and tear the surface of the rollers—and it is a well-known fact that vulcanized rubber can be easily cut when wet, and when the water is warm and soapy it is easily cut or torn by hard substances—and by being compressed upon one side and wrung upon the shaft it becomes expanded and loose, so that the shaft will turn in the rubber, and if there are rough projections or ribs, or anything protruding to act on the rubber,) it soon wears off, and the rollers of the wringers become useless.

By my discovery and invention, elastic india-rubber compound rollers used for the purpose of pressing the water out of clothes can be constructed with canvas or other similar material on the outer surface of the roll, and made more durable than those constructed without a covering. By covering them with heavy strong canvas D, or similar material put on tight, vulcanized or otherwise, elastic rollers made for pressing water out of clothes and liquids from other yielding substances can be protected, and made much more durable by covering them. When the canvas or cloth is wet, it contracts and becomes tighter than when it is dry. Thus it compresses the rubber and forces it the more tightly upon the shaft, so that there is no danger of its turning, and the periphery of the rollers are sufficiently protected against being cut, torn, or roughened up.

Having thus described my invention, what I claim as new, and desire to secure by Letters Patent, is—

The application of canvas, cloth, or other similar material for the purpose of covering, repairing, and protecting elastic india-rubber or compound rollers, and to prevent the shaft getting loose or turning in the roll, as and for the purpose specified.

JOSEPH F. POND.

Witnesses:

J. B. WOODRUFF,
W. J. JOHNSTON.